US007447785B2

(12) United States Patent
Kaler et al.

(10) Patent No.: US 7,447,785 B2
(45) Date of Patent: Nov. 4, 2008

(54) DEPENDENT CONTEXT TREES FOR RELATED NETWORK OFFERINGS

(75) Inventors: Christopher G. Kaler, Sammamish, WA (US); Erik B. Christensen, Seattle, WA (US); Giovanni M. Della-Libera, Seattle, WA (US); John P. Shewchuk, Redmond, WA (US); Stephen J. Millet, Edmonds, WA (US); Steven E. Lucco, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 688 days.

(21) Appl. No.: 10/403,857

(22) Filed: Mar. 31, 2003

(65) Prior Publication Data
US 2004/0193720 A1 Sep. 30, 2004

(51) Int. Cl.
*G06F 15/16* (2006.01)
(52) U.S. Cl. .................................................... 709/229
(58) Field of Classification Search ......... 709/220–222, 709/227–229; 707/104.1
See application file for complete search history.

(56) References Cited

U.S. PATENT DOCUMENTS 6,105,063 A * 8/2000 Hayes, Jr. .................... 709/223
6,108,712 A * 8/2000 Hayes, Jr. .................... 709/246
6,205,476 B1 * 3/2001 Hayes, Jr. .................... 709/220
6,237,092 B1 * 5/2001 Hayes, Jr. .................... 713/100
6,910,082 B1 * 6/2005 Marcotte ..................... 709/246
2001/0011341 A1 * 8/2001 Hayes, Jr. ..................... 712/11
2003/0110445 A1 * 6/2003 Khaleque .................... 715/505
2005/0114478 A1 * 5/2005 Popescu et al. ............. 709/220
2006/0075112 A1 * 4/2006 Polozoff ...................... 709/227

OTHER PUBLICATIONS

"Use of Context-Awareness in Mobile Peer-to-Peer Networks"; Richard Gold, GMD Fokus, Kaiserin-Augusta-Allee 31, D-10589 Berlin, Germany Cecilia Mascolo, Dept. of Computer Science, University College London, Gower St, London WC1E 6BT, UK 2001 IEEE p. 142 to 147.

* cited by examiner

*Primary Examiner*—Glenton B. Burgess
*Assistant Examiner*—Philip S. Scuderi
(74) *Attorney, Agent, or Firm*—Workman Nydegger

(57) ABSTRACT

A network site often provides multiple offerings, each having their own context. The complete context for one of the offerings is stored. That complete context represents a root node in a hierarchical tree of context nodes, each node representing the context information for one or more of the offerings. Each node in the tree includes a reference to its parent node, and then a description of incremental changes to the context information as compared to the context information from the parent node. Accordingly, the context information for a particular node in the tree may be obtained by combining the complete context for the root node offering with incremental changes described in other nodes in the ancestral chain that leads from the particular offering to the root offering.

30 Claims, 4 Drawing Sheets

DEPENDENT CONTEXT TREES FOR RELATED NETWORK OFFERINGS

BACKGROUND OF THE INVENTION

1. The Field of the Invention

The present invention relates to computer networking technology. More specifically, the present invention relates to mechanisms for using relationship chains to describe context information in terms of incremental changes for multiple offerings provided by a network site to thereby preserve storage requirements for the context information.

2. Background and Related Art

Computer networks allow computing systems (and potentially their associated users) to communicate one with another often over vast distances. The Internet, for example, allows Internet-enabled computing systems to communicate over vast distances in relatively little time. Many of these computing systems (often called server computing systems) have the ability to host network sites. Sometimes a cluster of server computing systems cooperatively interact to support the network site.

Client computing systems navigate to the network site in order to gain access to a variety of offerings provided by the network site. Such offerings might include services, session types, function sequences, or perhaps a single function. The context for each offering may have similar characteristics across some or all of the various offerings provided by the network site. The context for an offering is a set of rules and/or data that facilitates the proper operation of the offering. For example, an identification of required, preferred, or optional authentication methods, signature types, privacy statements, access control lists, subscription lists, policy, session keys, communication channels/state, or the like, represent examples of context information.

Some or perhaps even most of the context information for one offering in the network site may be the same as the context information for other offerings in the network site. Conventionally, the context information for each offering is stored in its entirety despite redundant context information existing across multiple offerings. Accordingly, what would be advantageous are mechanisms for maintaining context information for each of multiple offerings in the network site while reducing storage requirements.

BRIEF SUMMARY OF THE INVENTION

The foregoing problems with the prior state of the art are overcome by the principles of the present invention which are directed towards mechanisms for preserving storage space by storing context information in an incremental manner for one or more offerings provided by a network site. The context information may include rules and/or data that facilitate the appropriate operation of the corresponding offering. An offering may include access to the site itself, a service, a session type, a function sequence, or a single function.

More specifically, the complete context for one of the offerings is stored. That complete context represents a root node in a hierarchical tree of nodes, each node representing the context information for one or more of the offerings. Each node in the tree includes a reference or pointer to its parent node, and then a description of incremental changes to the context information as compared to the context information from the parent node. Accordingly, the context information for a particular node in the tree may be obtained by combining the complete context for the root node offering with incremental changes described in other nodes in the ancestral chain that leads from the particular offering to the root offering. Accordingly, redundant context information is not stored, thereby preserving storage space.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
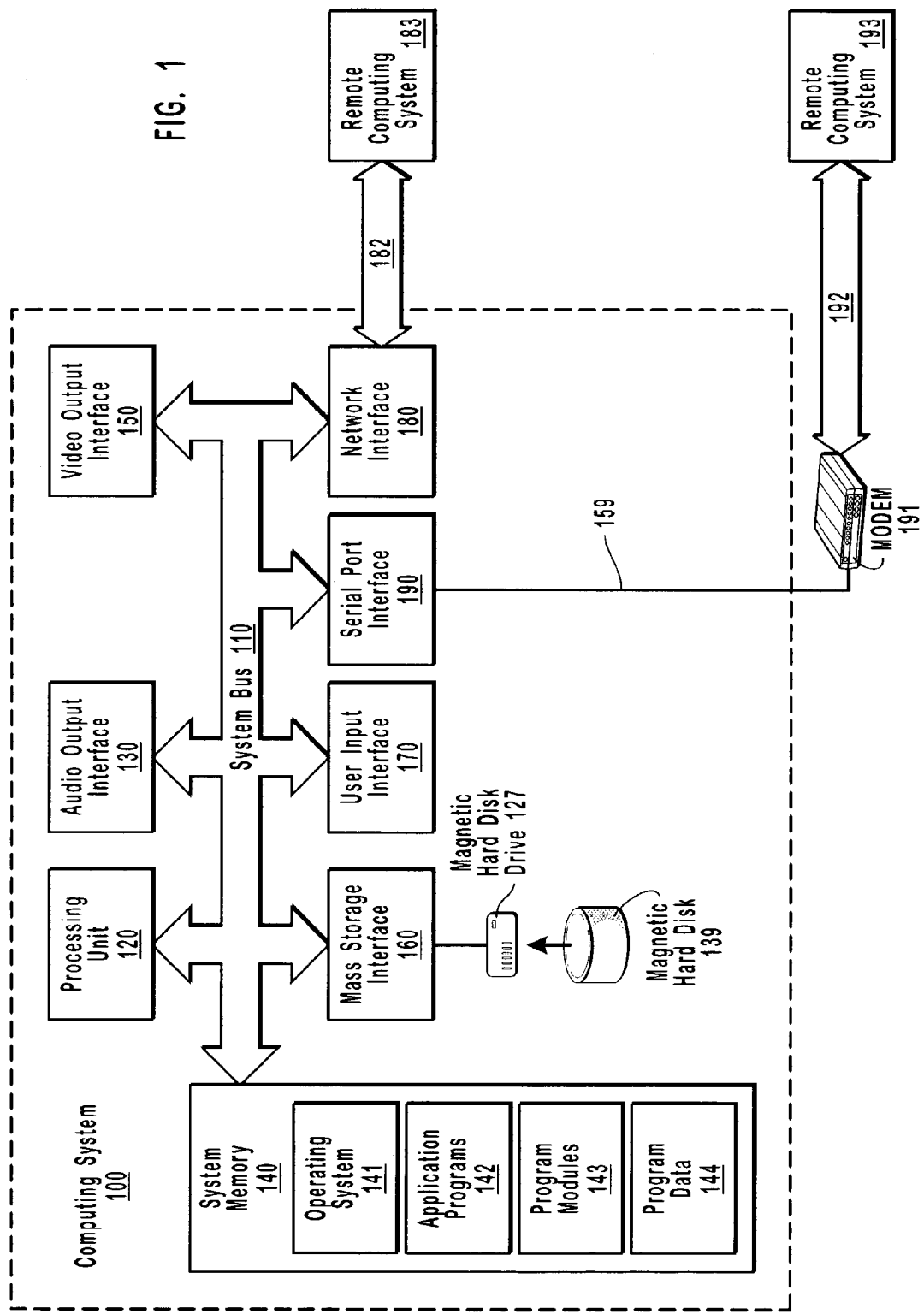
FIG. 1 illustrates a suitable computing system that may implement the principles of the present invention.

The principles of the present invention relate to mechanisms for preserving storage space by storing context information in an incremental manner for one or more offerings provided by a network site. More specifically, the complete context for one of the offerings is stored. That complete context represents a root node in a hierarchical tree of nodes, each node representing the context information for one or more of the offerings. Each node in the tree includes a reference to its parent node, and then a description of incremental changes to the context information as compared to the context information from the parent node. Accordingly, the context information for a particular node in the tree may be obtained by combining the complete context for the root node offering with incremental changes described in other nodes in the ancestral chain that leads from the particular offering to the root offering.

The embodiments of the present invention may comprise a general-purpose or special-purpose computer system including various computer hardware components, which are discussed in greater detail below. Embodiments within the scope of the present invention also include computer-readable media for carrying or having computer-executable instructions, computer-readable instructions, or data structures stored thereon. Such computer-readable media may be any available media, which is accessible by a general-purpose or special-purpose computer system.

By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "network" is defined as any architecture where two or more computing systems can exchange data with each other. When information is transferred or provided over a network or another communications connection (either hardwired, wireless, or a combination of hardwired or wireless) to a computing system, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions. The computer-executable instruction may be, for example, binaries, intermediate format instructions such as assembly language, or even source code.

In this description and in the following claims, a "computing system" is defined as one or more software modules, one or more hardware modules, or combinations thereof, that work together to perform operations on electronic data. For example, the definition of computing system may include the hardware components of a personal computer, as well as software modules such as the operating system of the personal computer. A computing system may include one or more computing systems coupled via a computer network. Likewise, a computing system may include a single physical device (such as a mobile phone, Personal Digital Assistant "PDA", or Tablet PC) where internal modules (such as a memory and processor) work together to perform operations on electronic data.

Those skilled in the art will appreciate that the invention may be practiced in network computing environments with many types of computing system configurations, including routers, gateways, firewalls, proxies, personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computing systems, which are linked (either by hardwired links, wireless links, or by a combination of hardwired and wireless links) through a network, both perform tasks. In a distributed system environment, program modules may be located in both local and remote memory storage devices.

FIG. 1 and the following discussion are intended to provide a brief, general description of a suitable computing environment in which the invention may be implemented. Although not required, the invention will be described in the general context of computer-executable instructions, such as program modules, being executed by computing systems. Generally, program modules include routines, programs, objects, components, data structures, and the like, which perform particular tasks or implement particular abstract data types.

With reference to FIG. 1, a suitable operating environment for the principles of the invention includes a general-purpose computing system in the form of a computing system 100. Computing system 100 may be a personal computer that has been adapted to perform the operations disclosed herein. It should be understood that computing system 100 is merely an example of one possible computing system configuration that can be used to practice the principles of the present invention.

Computing system 100 includes a user input interface 170 that receives information from an input device, such as, for example, a keyboard, microphone, or mouse, or other appropriate input device suitable for the form factor of the computing system. An input device can be coupled to user input interface 170 so as to enable information entry. An input device can transfer information over such a coupling in response to preprogrammed data or user manipulation of the input device.

Computing system 100 can also include video output interface 150, which provides a video output signal to external video display devices. Computing system 100 may be integrally positioned with or separate from a video display device, such as, for example, a color or monochrome monitor or display. A video display device can be coupled to video output interface 150 so as to receive a provided video output signal. The video output interface may also facilitate the rendering of non-video information on the screen as is often the case with mobile devices.

Similarly, computing system 100 includes an audio output interface 130 that provides an audio output signal to external audio output devices. Computing system 100 may also be integrally positioned with or separate from an audio system, which includes a speaker or other device capable of emitting sound data. An audio system can be coupled to audio output interface 130 so as to receive a provided audio output signal.

Computing system 100 includes processing unit 120, which allows for complex and flexible general-purpose processing capabilities. Processing unit 120 executes computer-executable instructions designed to implement features of computing system 100, including features of the present invention. Processing unit 120 is coupled to system bus 110, which also interconnects various other system components, including system memory 140.

System memory 140 generally represents a wide variety of volatile and/or non-volatile memories and may include types of memory previously discussed. Program code means comprising one or more program modules may be stored in system memory 140. The one or more program modules may include an operating system 141, one or more application programs 142, other program modules 143, and program data 144.

Computing system 100 also may include magnetic hard disk drive 127 for reading from and writing to magnetic hard disk 139. The magnetic hard disk drive 127 is connected to system bus 110 by mass storage interface 160. Magnetic hard disk drive 127 and magnetic hard disk 139 provide nonvolatile storage of computer-executable instructions, data structures, program modules, and other data for computing system 100. For example, magnetic hard disk 139 can store one or more program modules including operating system 141, application programs 142, other program modules 143, and program data 144.

Computing system 100 can be network connectable to networks, such as, for example, an office-wide or enterprise-wide computing network, an intranet and/or the Internet. Computing system 100 may exchange data with external systems, such as, for example, remote message processors and/or databases over such a network. Computing system 100 includes network interface 180, through which computing system 100 receives data from and transmits data to external systems. As illustrated in FIG. 1, network interface 180 facilitates the exchange of data with remote computing system 183 via logical communication link 182. Logical communication link 182 represents a portion of a network, and remote computing system 183 represents a node of the network. For example, remote computing system 183 can be a client message processor, a server message processor, or a validating message processor.

Likewise, computing system 100 includes serial port interface 190, through which computing system 100 receives data from and/or transmits data to external system. Serial port interface 190 is coupled to modem 191 via logical communication link 159, through which computing system 100 receives data from and/or transmits data to external sources. As illustrated in FIG. 1, serial port interface 190 and modem 191 facilitate the exchange of data with remote computing system 193 via logical communication link 192. Logical communication link 192 represents a portion of a network, and remote computing system 193 represents a node of the network. For example, remote computing system 193 can be a client message processor, a server message processor, or a validating message processor.

Alternatively, computing system 100 can exchange data with external sources through other interfaces, such as, for example, a parallel port, a game port, or a universal serial bus ("USB") port. It should be understood that the described network connections are merely examples. It would be apparent to one skilled in the art, after having reviewed this description, that a wide variety of network connection techniques, in addition to those described with reference to FIG. 1, may be used to facilitate the exchange of data between computing system 100 and external systems.

While FIG. 1 represents a suitable operating environment for the present invention, the principles of the present invention may be employed in any computing system that is capable of, with suitable modification if necessary, implementing the principles of the present invention. The environment illustrated in FIG. 1 is illustrative only and by no means represents even a small portion of the wide variety of environments in which the principles of the present invention may be implemented.

Figure 2:
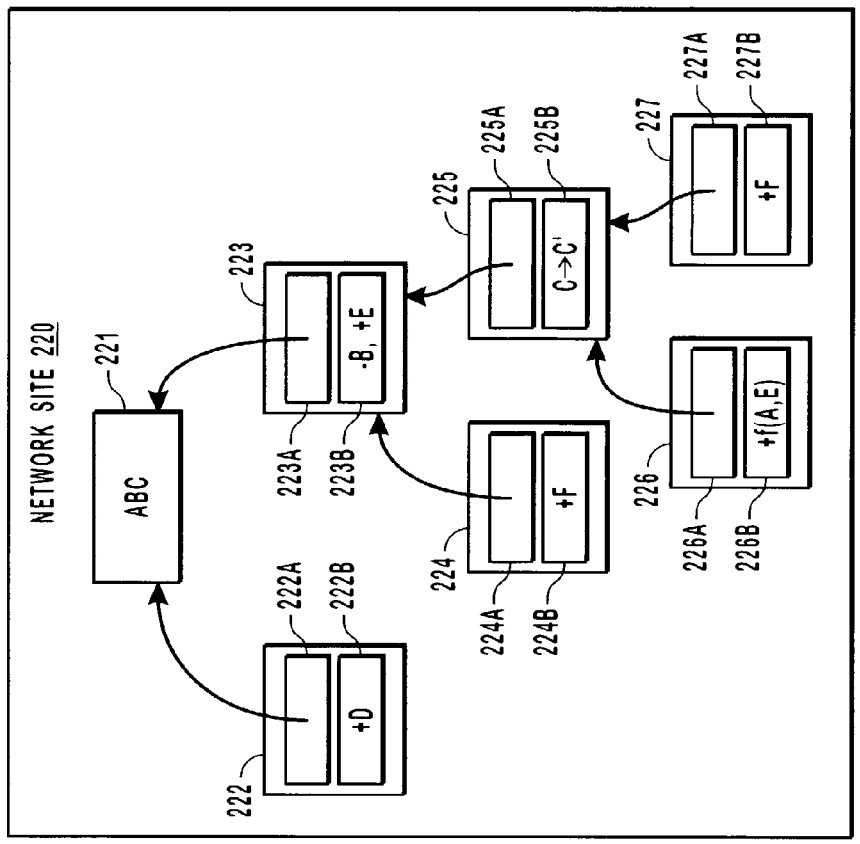
FIG. 2 illustrates a suitable network environment in which the principles of the present invention may operate.
Figure 2:
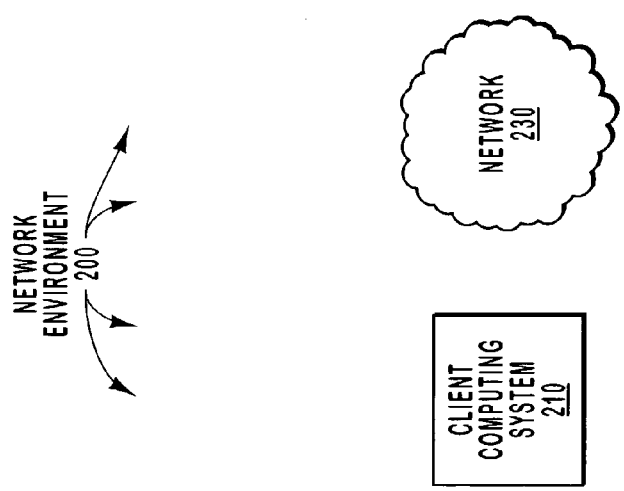

FIG. 2 illustrates a network environment 200 in which the present invention may be employed. The network environment 200 includes a client computing system 210 that is capable of communicating over a network 230 with a network site 220. The client computing system 210 may be structured similar to the above-described computing system 100 or may be any other computing system. The network site 220 may be hosted by a single server computing system or a cluster of server computing systems, each potentially being structured similar to the above-described computing system 100 or any other computing system capable of hosting a network site.

The network site 220 provides a number of offerings have a certain context. For example, context node 221 represents context information for one or more offerings provided by the network site 220. In this description and in the claims, an "offering" is defined as any network site, services provided by the network site, or other functional operations that facilitate one or more services such as session types, functions sequences, or single functions. In this description and in the claims, "context" refers to a set of rules and/or data that facilitates an offering. For example, an identification of required, preferred, or optional authentication methods, signature types, privacy statements, access control lists, subscription lists, policy, session keys, communication channels/state, or the like, represent examples of context information.

In addition to the offerings that use the context information represented by context node 221, the network site may also provide other offerings that use different context information. For example, contexts nodes 222 through 227 each represent different context information that may be used to provide one or more offerings. There are common context elements across all of the context nodes. In this description and in the claims, a "context element" is a separately describable component of context information. Rather than the context information for each offering being separately and redundantly stored, the network site 220 organizes the context information by relating one context node to another, and by incrementally describing the context information for a child context node with respect to the its parent context node.

Figure 3:
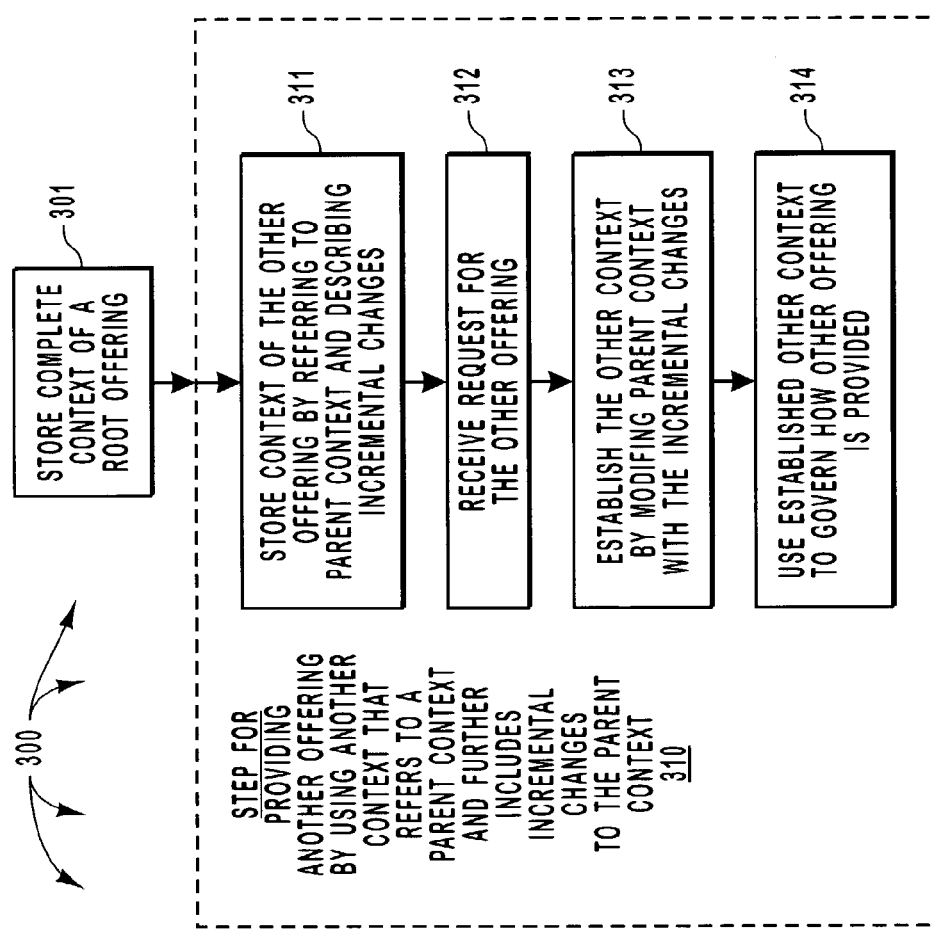
FIG. 3 illustrates a flowchart of a method for one or more server computing systems providing a context of each of a number of offerings of a network site in a memory efficient manner in accordance with the principles of the present invention.

FIG. 3 illustrates a flowchart of a method 300 for one or more server computing systems providing a context of each of a number of offerings of a network site in a memory efficient manner in accordance with the principles of the present invention. The method 300 may be implemented on network site 220. Accordingly, the method 300 of FIG. 3 will be frequently described referring back to the particular network site 220 and associated contexts of FIG. 2. However, those of ordinary skill in the art will appreciate (after having reviewed this description) that the method 300 may operate with any related configuration of contexts in which one context node is a parent of another context node, and where the child context node refers to the parent node.

The method 300 includes an act of storing a complete context of a first offering of the plurality of offerings (act 301). For example, referring to FIG. 2, context node 221 may represent context information for a network site generally, and includes context elements A, B, and C. The first offering might be, for example, a network site. In this description and in the claims, the designation of the terms "first", "second", "third", "fourth" and so forth with respect to a particular element or item is used merely to distinguish one element from the other, and does not itself convey any sort of sequential temporal relationship.

The method 300 then includes a functional, result-oriented step for providing another offering by using a context that refers to a parent context only and further includes incremental changes to the parent context (step 310). While the step may include any corresponding specific acts that combine to accomplish this result, FIG. 3 illustrates the step 310 as including corresponding acts 311, 312, 313, and 314.

Specifically, the step 310 includes the corresponding act of storing a context of a second offering of the plurality of offerings, the context of the second offering being incrementally described by referring to, but not including, the context of its parent context node, and also by being described by incremental changes to the context of the parent node (act 311).

For example, referring to FIG. 2, context node 222 includes a reference 222A (such as a pointer or handle) to the context node 221, and describes incremental changes 222B. In this case, the incremental changes specify the addition of context element D. Accordingly, the context node 222 would be interpreted as corresponding to context elements A, B, C and D. Context elements A, B and C are inherited from the parent context node 221, and context element D is expressly added. All offerings that map to the context node 222 would accordingly be assigned context information A, B, C and D.

Context node 223 includes a reference 223A to the context node 221, and describes incremental changes 223B. In this case, the incremental changes specify the deletion of context element B, and the addition of context element E. Accordingly, the context node 222 would be interpreted as corresponding to context elements A, C and E. Context elements A, B and C are inherited from the parent context node 221, and context element D is expressly added. Context nodes 222 and 223 may represent context information for offerings such as, for example, services provided by the network site.

Context node 224 includes a reference 224A to the context node 223, and describes incremental changes 224B. In this case, the incremental changes specify the addition of context element F. Accordingly, the context node 224 would be interpreted as corresponding to context elements A, C, E and F. Context elements A, C and E are inherited from the parent context node 223, and context element F is expressly added.

Context node 225 includes a reference 225A to the context node 223, and describes incremental changes 225B. In this case, the incremental changes specify the replacement of element C with element C'. Accordingly, the context node 224 would be interpreted as corresponding to context elements A, C' and E. Context elements A, C and E are inherited from the parent context node 223, and with context element C' expressly replacing context element C. Context nodes 222 and 223 may represent context information for offerings such as, for example, session types provided by a particular service.

Context node 226 includes a reference 226A to the context node 225, and describes incremental changes 226B. In this case, the incremental changes specify the addition of some element that represents some function of context elements A and E named f(A,E). Accordingly, the context node 226 would be interpreted as corresponding to context elements A, C', E and f(A,E). Context elements A, C' and E are inherited from the parent context node 225, and with context element f(A,E) being expressly added.

Context node 227 includes a reference 227A to the context node 225, and describes incremental changes 227B. In this case, the incremental changes specify the addition of element F. Accordingly, the context node 227 would be interpreted as corresponding to context elements A, C', E and F. Context elements A, C' and E are inherited from the parent context node 225, and with context element F being expressly added.

In order to separately store each context node as in conventional technology, the server computing system(s) that hosts the network site would store three context elements for context node 221 (namely, A, B and C), four context elements for context node 222 (namely, A, B, C and D), three context elements for context node 223 (namely, A, C and E), four context elements for context node 224 (namely, A, C, E and F), three context elements for context node 225 (namely, A, C' and E), four context elements for context node 226 (namely, A, C', E and f(A,E)), and four context elements for context node 227 (namely, A, C', E and F). This totals 25 total context elements that would be conventionally stored.

In contrast, the principles of the present invention would facilitate a reduction in the requirement to store context elements to be stored. In particular, three context elements would be stored for context node 221, (namely, A, B and C), one context element for context node 222 (namely, E), one context element for context node 223 (namely, E), one context element for context node 224 (namely, F), one context element for context node 225 (namely, C'), zero context elements for context node 226, and one context element for context node 227 (namely, F). This totals as few as 8 total context elements that might be stored using embodiments of the present invention. Note that the element f(A,E) may be stored as well. However, it would only be needed to store an identification of the elements A and E and the associated function to be performed on these elements. The resulting element itself need not be stored unless so desired for processing efficiency. Note also that a reference to the parent context node is stored. Nevertheless, for almost all context node configurations, a reduction in storage requirements is accomplished.

Returning to FIG. 3, the step 310 includes an act of receiving a request for the second offering (act 313). This request may be received at the network site 220 from the client computing system 210. This second offering corresponds to a particular context node, such as, for example, context node 222. The step 310 then includes a corresponding act of establishing the context of the second offering by modifying the context of the parent context node with the incremental changes describing the second offering. For context element 222, this might include acquiring the context elements A, B, and C from context node 221, and then adding context element D. However, the context information for context nodes that are deeper in the context tree may also be efficiently constructed as in accordance with the method 400 of FIG. 4, which will be described further below.

The step 310 then includes an act of using the established context of the second offering to govern how the second offering is provided in response to the request (act 314). For example, when responding to a request for an offering that maps to context node 222, the server computing system(s) that host the network site 220 would use context information A, B, C and D to govern how it provides the offering to the client computing system 210.

Figure 4:
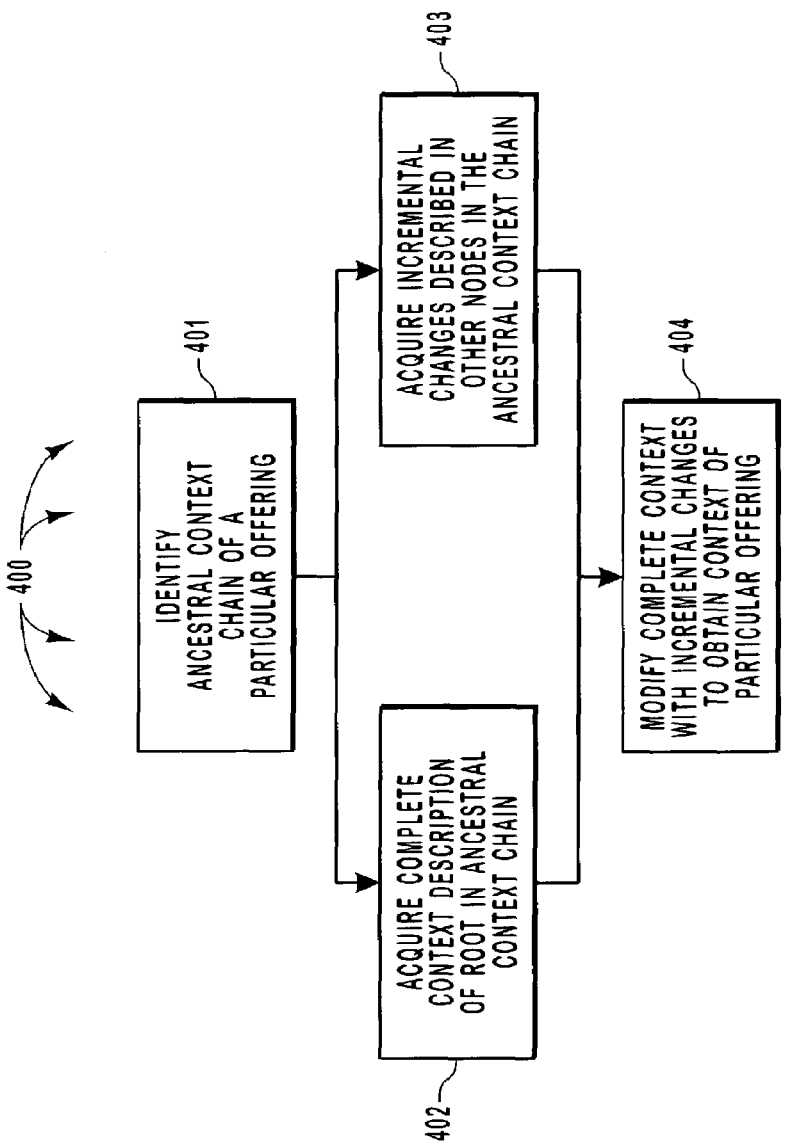
FIG. 4 illustrates a flowchart of a method for determining a context associated with a particular offering in accordance with the principles of the present invention.

FIG. 4 illustrates a flowchart of a method 400 for establishing a context in accordance with the principles of the present invention. For example, support the context information for an offering associated with context node 227 is to be established. Method 400 includes an act of identifying an ancestral chain associated with the particular offering (act 401). In the case of context node 227, the ancestral chain would include context nodes 221, 223, 225 and 227.

The method 400 then includes an act of acquiring a complete context description of a root node in the ancestral chain (act 402). In the example, the context description for context elements A, B and C would be acquired. The incremental changes described in each of the other nodes in the ancestral chain including the particular node would also be acquired (act 403). In the example, the following incremental changes would be acquired: delete B, add E, replace C with C', and add F. Since all of these changes are mutually consistent and may be implemented in any order without violating dependencies, the incremental changes may be implemented in any order or even in parallel, thereby improving processing efficiency. Accordingly, the complete context of the root node is modified with the incremental changes described in each of the other nodes in the ancestral chain including the particular node to obtain the context of the particular node (act 227). Accordingly, a mechanism has been described in which context information for multiple offerings may be efficiently stored.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In a network environment that includes a client computing system and one or more server computing systems that host a network site that provides a plurality of offerings, each offering having its own context governing the operation of the corresponding offering, a method for the one or more server computing systems providing the context of each of the offerings in a memory efficient manner, the method comprising the following:

an act of storing at a first context node within a hierarchical arrangement of a plurality of context nodes, a complete context of the first offering of the plurality of offerings, the complete context of the first offering representing a default context for the network site, and the first context node representing the first offering of the plurality of offerings;

an act of storing at a second context node within the hierarchical arrangement of the plurality of context nodes, a context of a second offering of the plurality of offerings, the second context node being at a lower hierarchical level than the first context node and the second context node representing the second offering of the plurality of offerings, the context of the second offering representing the context of a sub-component of the network site, the second context including a reference to an intermediate context node at an intermediate hierarchical level between the first context node and the second context node, the intermediate context node representing a higher level offering between the first offering and the second offering, and further including one or more incremental context changes describing how to establish the context of the second offering from the context of the higher level offering represented by the intermediate context node;

an act of receiving a request for the second offering;

an act of traversing from the context of the second offering to the context of the first offering to accumulate incremental context changes at intermediate offering levels between the second offering and the first offering;

an act of establishing a complete context of the second offering, comprising:

an act of modifying the complete context of the first offering with the incremental context changes from each of the intermediate context nodes representing offering levels between the second offering and the first offering, the incremental context changes being applied in any order in response to the request for the second offering, each context change being mutually consistent with context changes at other offering levels such that the incremental context changes result in the same context change for the first offering, regardless of the level or order in which the context changes are applied, to obtain one or more desired context changes at a particular offering level; and an act of modifying the complete context of the first offering with the one or more incremental context changes from the second context node, the incremental context changes being applied in any order in response to the request for the second offering, each context change being mutually consistent with context changes at other offering levels such that the incremental context changes result in the same context change for the first offering, regardless of the level or order in which the context changes are applied, to obtain one or more desired context changes at a particular offering level, wherein the act of modifying the complete context of the first offering with the one or more incremental context changes from the second context node is performed in parallel with said act of modifying the complete context of the first offering with the incremental context changes from each of the intermediate context nodes; and an act of using the established complete context of the second offering to govern how the second offering is provided in response to the request.

2. A method in accordance with claim 1, further comprising the following:

an act of storing at a third context node a context of a third offering of the plurality of offerings, the context of the third offering being incrementally described by referring to, but not including, the context of the second offering, and also by being described by incremental context changes to the complete context of the second offering;

an act of receiving a request for the third offering;

an act of establishing a complete context of the third offering by modifying the complete context of the second offering with the incremental context changes describing the third offering; and an act of using the established complete context of the third offering to govern how the third offering is provided in response to the request.

3. A method in accordance with claim 2, further comprising the following:

an act of storing at a fourth context node a context of a fourth offering of the plurality of offerings, the context of the fourth offering being incrementally described by referring to, but not including, the complete context of the first offering, and also by being described by incremental context changes to the complete context of the first offering;

an act of receiving a request for the fourth offering;

an act of establishing a complete context of the fourth offering by modifying the complete context of the first offering with the incremental context changes describing the fourth offering; and an act of using the established complete context of the fourth offering to govern how the fourth offering is provided in response to the request.

4. A method in accordance with claim 1, further comprising the following:

an act of storing at a third context node a context of a third offering of the plurality of offerings, the context of the third offering being incrementally described by referring to, but not including, the complete context of the first offering, and also by being described by incremental context changes to the complete context of the first offering;

an act of receiving a request for the third offering;

an act of establishing a complete context of the third offering by modifying the complete context of the first offering with the incremental context changes describing the third offering; and an act of using the established complete context of the third offering to govern how the third offering is provided in response to the request.

5. A method in accordance with claim 1, wherein the plurality of offerings includes a site.

6. A method in accordance with claim 5, wherein the plurality of offerings includes a service provided within the site.

7. A method in accordance with claim 6, wherein the plurality of offerings includes a session type provided by the service.

8. A method in accordance with claim 6, wherein the plurality of offerings includes a function sequence provided by the service.

9. A method in accordance with claim 6, wherein the plurality of offerings includes a function provided by the service.

10. A method in accordance with claim 1, wherein each context includes a set of rules that governs how the corresponding offering is to operate.

11. A method in accordance with claim 10, wherein each context also includes a set of data that applies to the corresponding offering.

12. A method in accordance with claim 1, wherein each context includes a set of data that applies to the corresponding offering.

13. A computer program product for use in a network environment that includes a client computing system and one or more server computing systems that host a network site that provides a plurality of offerings, each offering having its own context governing the operation of the corresponding offering, the computer program product for implementing a method for the one or more server computing systems providing the context of each of the offerings in a memory efficient manner, the computer program product comprising one or more recordable-type computer-readable storage media having thereon computer-executable instructions for performing the following:

causing a complete context of a first offering of the plurality of offerings to be stored at a first context node within a hierarchical arrangement of a plurality of context nodes, the first context node representing the first offering of a plurality of offerings, and the complete context of the first offering representing the default context for the network site;

causing a context of a second offering of the plurality of offerings to be stored at a second context node within a hierarchical arrangement of a plurality of context nodes, the second context node being at a lower hierarchical level than the first context node and the second context node representing the second offering of the plurality of offerings, the context of the second offering representing the context of a sub-component of the network site, the second context including a reference to an intermediate context node at an intermediate hierarchical level between the first context node and the second context node, the intermediate context node representing a context of a higher level offering between the first offering and the second offering, and further including one or more incremental context changes describing how to establish the context of the second offering from context of the higher level offering represented by the intermediate context node;

detecting receipt of a request for the second offering;

traversing from the context of the second offering to the context of the first offering to accumulate incremental context changes at intermediate offering levels between the second offering and the first offering;

establishing a complete context of the second offering by:
modifying the complete context of the first offering with the accumulated incremental context changes from each of the intermediate context nodes representing intermediate offering levels between the second context node and the first context node, the incremental context changes being applied in any order in response to the request for the second offering, each context change being mutually consistent with context changes at other offering levels such that the incremental context changes are result in the same context change for the first offering, regardless of the level or order in which the context changes are applied, to obtain one or more desired context changes at a particular offering level; and modifying the complete context of the first offering with the one or more incremental context changes from the second context node representing the second offering, the incremental context changes being applied in any order in response to the request for the second offering, each context change being mutually consistent with context changes at other offering levels such that the incremental context changes result in the same context change for the first offering, regardless of the level or order in which the context changes are applied, to obtain one or more desired context changes at a particular offering level, wherein modifying the complete context of the first offering with the one or more incremental context changes from the second context node is performed in parallel with the modifying of the complete context of the first offering with the accumulated incremental context changes from each of the intermediate context nodes; and using the established complete context of the second offering to govern how the second offering is provided in response to the request.

14. A computer program product in accordance with claim 13, wherein the one or more recordable-type computer-readable storage media include volatile system memory.

15. A computer program product in accordance with claim 13, wherein the one or more recordable-type computer-readable storage media include non-volatile storage.

16. A computer program product in accordance with claim 13, wherein the one or more recordable-type computer-readable storage media further have thereon computer-executable instructions for performing the following:

causing a context of a third offering of the plurality of offerings to be stored at a third context node, the context of the third offering being incrementally described by referring to, but not including, the context of the second offering, and also by being described by incremental changes to the complete context of the second offering;

detecting receipt of a request for the third offering;

establishing a complete context of the third offering by modifying the complete context of the second offering with the incremental changes describing the third offering; and using the established complete context of the third offering to govern how the third offering is provided in response to the request.

17. A computer program product in accordance with claim 16, wherein the one or more recordable-type computer-readable storage media further have thereon computer-executable instructions for performing the following:

causing a context of a fourth offering of the plurality of offerings to be stored at a fourth context node, the context of the fourth offering being incrementally described by referring to, but not including, the complete context of the first offering, and also by being described by incremental context changes to the complete context of the first offering;

detecting receipt of a request for the fourth offering;

establishing a complete context of the fourth offering by modifying the complete context of the first offering with the incremental context changes describing the fourth offering; and using the established complete context of the fourth offering to govern how the fourth offering is provided in response to the request.

18. A computer program product in accordance with claim 13, wherein the one or more recordable-type computer-readable storage media further have thereon computer-executable instructions for performing the following:
  causing a context of a third offering of the plurality of offerings to be stored at a third context node, the context of the third offering being incrementally described by referring to, but not including, the complete context of the first offering, and also by being described by incremental context changes to the complete context of the first offering;
  detecting receipt of a request for the third offering;
  establishing a complete context of the third offering by modifying the complete context of the first offering with the incremental context changes describing the third offering; and
  using the established complete context of the third offering to govern how the third offering is provided in response to the request.

19. A computer program product in accordance with claim 13, wherein the plurality of offerings includes a site.

20. A computer program product in accordance with claim 19, wherein the plurality of offerings includes a service provided within the site.

21. A computer program product in accordance with claim 20, wherein the plurality of offerings includes a session type provided by the service.

22. A computer program product in accordance with claim 20, wherein the plurality of offerings includes a function sequence provided by the service.

23. A computer program product in accordance with claim 20, wherein the plurality of offerings includes a function provided by the service.

24. A computer program product in accordance with claim 13, wherein each context includes a set of rules that governs how the corresponding offering is to operate.

25. A computer program product in accordance with claim 24, wherein each context also includes a set of data that applies to the corresponding offering.

26. A computer program product in accordance with claim 13, wherein each context includes a set of data that applies to the corresponding offering.

27. In a network environment that includes a client computing system and one or more server computing systems that host a network site that provides a plurality of offerings, each offering having its own context governing the operation of the corresponding offering, a method for the one or more server computing systems providing the context of each of the offerings in a memory efficient manner, the method comprising the following:
  an act of storing at a first context node in a hierarchical arrangement of a plurality of context nodes, a complete context of a first offering of the plurality of offerings, the complete context of the first offering representing the default context for the network site, and the first context node representing the first offering of the plurality of offerings; and
  a step for providing a second offering, the context of the second offering representing the context of a sub-component of the network site, the context of the second offering including a reference to a node in the hierarchical arrangement containing the context of a higher level offering and further including incremental context changes describing how to establish the complete context of the second offering from the context of the higher level offering and in a manner that modifies the complete context of the first offering with the incremental context changes from the context of the second context node representing the second offering and with the context from one or more intermediate context nodes representing intermediate offering levels, the incremental context changes being applied in any order in the provided second offering, each context change being mutually consistent with context changes at other offering levels such that the incremental context changes result in the same context change for the first offering, regardless of the level or order in which the context changes are applied, to obtain one or more desired context changes at a particular offering level, the modifying of the complete context of the first offering with the incremental context changes from the context of the second context node being performed in parallel with the modifying of the complete context of the first offering with the incremental context changes from the one or more intermediate context nodes.

28. A method in accordance with claim 27, wherein the step for providing a second offering by using a context that refers to the complete context only and further includes incremental changes to the complete context comprises the following:
  an act of storing at a second context node representing the second offering a context of the second offering of the plurality of offerings, the context of the second offering being incrementally described by referring to, but not including, the complete context of the first offering, and also by being describing by incremental context changes to the complete context of the first offering;
  an act of receiving a request for the second offering;
  an act of establishing a complete context of the second offering by modifying the complete context of the first offering with the incremental context changes describing the second offering; and
  an act of using the established complete context of the second offering to govern how the second offering is provided in response to the request.

29. A method as recited in claim 1, wherein the reference to the intermediate context node is a pointer, and wherein the method further includes an act of identifying the intermediate context node using the pointer.

30. A system for providing the context of one or more offerings in a memory efficient manner, the system comprising a processor and computer-readable storage media storing computer-executable instructions which are implemented by the processor and which include:
  means for storing at a first context node within a hierarchical arrangement of a plurality of context nodes, a complete context of the first offering of the plurality of offerings, the complete context of the first offering representing a default context for the network site, and the first context node representing the first offering of the plurality of offerings;
  means for storing at a second context node within the hierarchical arrangement of the plurality of context nodes, a context of a second offering of the plurality of offerings, the second context node being at a lower hierarchical level than the first context node and the second context node representing the second offering of the plurality of offerings, the context of the second offering representing the context of a sub-component of the network site, the second context including a reference to an intermediate context node at an intermediate hierarchical level between the first context node and the second context node, the intermediate context node representing a higher level offering between the first offering and the second offering, and further including one or more incremental context changes describing how to establish the context of the second offering from the context of the higher level offering represented by the intermediate context node;

means for receiving a request for the second offering;

means for traversing from the context of the second offering to the context of the first offering to accumulate incremental context changes at intermediate offering levels between the second offering and the first offering;

means for establishing a complete context of the second offering, comprising:

means for modifying the complete context of the first offering with the incremental context changes from each of the intermediate context nodes representing offering levels between the second offering and the first offering, the incremental context changes being applied in any order in response to the request for the second offering, each context change being mutually consistent with context changes at other offering levels such that the incremental context changes result in the same context change for the first offering, regardless of the level or order in which the context changes are applied, to obtain one or more desired context changes at a particular offering level; and means for modifying the complete context of the first offering with the one or more incremental context changes from the second context node, the incremental context changes being applied in any order in response to the request for the second offering, each context change being mutually consistent with context changes at other offering levels such that the incremental context changes result in the same context change for the first offering, regardless of the level or order in which the context changes are applied, to obtain one or more desired context changes at a particular offering level, wherein the act of modifying the complete context of the first offering with the one or more incremental context changes from the second context node is performed in parallel with said act of modifying the complete context of the first offering with the incremental context changes from each of the intermediate context nodes; and using the established complete context of the second offering to govern how the second offering is provided in response to the request.

* * * * *

UNITED STATES PATENT AND TRADEMARK OFFICE
CERTIFICATE OF CORRECTION

| | | |
|---|---|---|
| PATENT NO. | : 7,447,785 B2 | Page 1 of 1 |
| APPLICATION NO. | : 10/403857 | |
| DATED | : November 4, 2008 | |
| INVENTOR(S) | : G. Kaler et al. | |

It is certified that error appears in the above-identified patent and that said Letters Patent is hereby corrected as shown below:

In column 11, line 65, in Claim 13, after "changes" delete "are".

Signed and Sealed this
Third Day of May, 2011

David J. Kappos
*Director of the United States Patent and Trademark Office*